United States Patent
Funaki et al.

(10) Patent No.: US 8,702,175 B2
(45) Date of Patent: Apr. 22, 2014

(54) VEHICLE SEAT

(75) Inventors: Syohei Funaki, Miyoshi (JP); Osamu Kanayama, Toyota (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 13/597,482

(22) Filed: Aug. 29, 2012

(65) Prior Publication Data

US 2013/0049424 A1    Feb. 28, 2013

(30) Foreign Application Priority Data

Aug. 31, 2011  (JP) .................................. 2011-188703

(51) Int. Cl.
*B60N 2/64*     (2006.01)
*A47C 7/02*     (2006.01)

(52) U.S. Cl.
USPC ................................ 297/452.37; 297/452.34

(58) Field of Classification Search
USPC ............. 297/452.29, 452.32, 452.33, 452.34, 297/452.35, 452.37, 284.9, DIG. 1
See application file for complete search history.

(56) References Cited

U.S. PATENT DOCUMENTS

| | | | | | |
|---|---|---|---|---|---|
| 3,161,436 | A | * | 12/1964 | Hood | 297/452.27 |
| 3,675,970 | A | * | 7/1972 | Bereday | 297/452.55 |
| 3,713,696 | A | * | 1/1973 | Dudley | 297/452.55 |
| 4,572,578 | A | * | 2/1986 | Perkins | 297/452.32 |
| 4,835,801 | A | * | 6/1989 | Walpin et al. | 5/652 |
| 5,039,158 | A | * | 8/1991 | Maier | 297/452.37 |
| 5,441,331 | A | * | 8/1995 | Vento | 297/452.33 |
| 8,398,170 | B2 | * | 3/2013 | Walker | 297/284.3 |
| 2009/0273221 | A1 | * | 11/2009 | Kao | 297/452.29 |

FOREIGN PATENT DOCUMENTS

| | | | |
|---|---|---|---|
| EP | 000109258 | A2 * | 5/1984 |
| JP | 2001-70083 | | 3/2001 |
| JP | 2010-083269 | | 4/2010 |

\* cited by examiner

*Primary Examiner* — Milton Nelson, Jr.
(74) *Attorney, Agent, or Firm* — Greenblum & Bernstein, P.L.C.

(57) ABSTRACT

A vehicle seat includes a seat cushion, and a seat back that is connected to the seat cushion in a manner so as to be able to be raised and reclined. The seat back has a cushion that supports an occupant. The cushion includes a main portion that opposes a torso of the occupant, and a side portion that is arranged on an outside of the main portion in a seat with direction and that protrudes toward a seating side of the seat back. The side portion includes a first portion that is arranged on an upper portion of the side portion and opposes a shoulder of the occupant when the seat back is in an upright position, and a second portion that forms the side portion other than the first portion. The first portion and the main portion are configured to elastically compress easier than the second portion.

3 Claims, 3 Drawing Sheets

VEHICLE SEAT

INCORPORATION BY REFERENCE

The disclosure of Japanese Patent Application No. 2011-188703 filed on Aug. 31, 2011 including the specification, drawings and abstract is incorporated herein by reference in its entirety.

BACKGROUND OF THE INVENTION

1. Field of the Invention

The invention relates to a vehicle seat provided with a cushion (i.e., a member that elastically supports an occupant).

2. Description of Related Art

Japanese Patent Application Publication No. 2001-70083 (JP 2001-70083 A), for example, describes one such known vehicle seat that includes a seat cushion, a seat back, and a headrest. The seat back is a member that is connected to the seat cushion, in a manner so as to be able to be reclined and raised, with respect to the seat cushion, and has a cushion that forms an outer shape of the seat. The cushion is a member that elastically supports an occupant, and includes a main portion and a pair of side portions. The main portion is a flat portion in the center of the cushion, and opposes the torso of a seated occupant. Also, the side portions are protruding portions that are positioned one on each side of the main portion, and protrude farther toward a seating side than the main portion. Each side portion includes an inner side portion that is adjacent to the main portion, and an outer side portion that is positioned on an outside of the inner side portion in a seat width direction. The main portion is divided laterally into two (i.e., an upper portion and a lower portion), and the inner side portion and the outer side portion are formed extending along both of the upper and lower portions of the main portion (i.e., continuous in the vertical direction of the seat).

In the related art, the outer side portions (i.e., the portions farthest to the outside in the seat width direction) are made of high hardness urethane foam. Also, the inner side portions and the main portion are made of urethane foam that has a lower hardness (i.e., is more flexible) than the outer side portions. In this way, during normal driving, the torso and shoulders and the like of the occupant are loosely supported by the inner side portions and the main portion that are low hardness portions, so a feeling of pressure on the occupant is able to be reduced. That is, the structure provides excellent seating comfort. Also, the occupant is firmly supported by the outer side portions that are high hardness portions, so the support performance of the seat is able to be maintained to a certain degree.

In the related art, the inner side portions are formed continuous in the vertical direction of the seat. Therefore, when pressure from the occupant is applied to a side portion (e.g., a lower portion of the inner side portion) or the like when the load of the occupant shifts when the vehicle is cornering or when the vehicle is involved in a collision, the support performance of the cushion may be insufficient.

SUMMARY OF THE INVENTION

The invention thus provides a vehicle seat in which the support performance of a cushion is able to be improved while suitably maintaining seating comfort.

One aspect of the invention relates to a vehicle seat that includes a seat cushion, and a seat back that is connected to the seat cushion in a manner so as to be able to be raised and reclined with respect to the seat cushion. The seat back has a cushion that forms an outer shape of the seat and supports an occupant. With this kind of seat structure, it is desirable to improve the support performance of the cushion while suitably maintaining seating comfort.

The cushion includes a main portion that opposes a torso of the occupant when the occupant is seated, and a side portion that is arranged on an outside of the main portion in a seat width direction and that protrudes toward a seating side of the seat back. The side portion includes a first portion that is arranged on an upper portion of the side portion and opposes a shoulder of the occupant when the seat back is in an upright position, and a second portion that forms the side portion other than the first portion. The first portion and the main portion are configured to elastically compress easier than the second portion, so seating comfort for the occupant is able to be suitably maintained. Also, the second portion does not elastically compress as easily as the first portion and the main portion, so the support performance of the cushion is able to be improved.

The vehicle seat described above may also include a headrest that is arranged on or above the seat back. Also, the seat back may have a frame member that forms a seat frame, and the headrest may be attached to the frame member. The cushion may be arranged on the frame member while a gap is provided between the frame member and the first portion. According to this structure, when an occupant is pushed into the seat back by an impact at the time of a vehicle collision, the gap between the frame member and the first portion shrinks while the upper portion of the cushion elastically compresses. That is, the headrest will be relatively displaced toward the seating side of the seat back. With this structure, when the vehicle is involved in a collision, the headrest will be relatively displaced toward the seating side and thus quickly abut against the head of the occupant, so forward-and-backward movement of the head of the occupant is able to be suitably prevented or reduced.

According to the aspect described above, the support performance of the cushion is able to be improved while suitably maintaining seating comfort. Moreover, the structure described above enables the support performance of the cushion to be even further improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
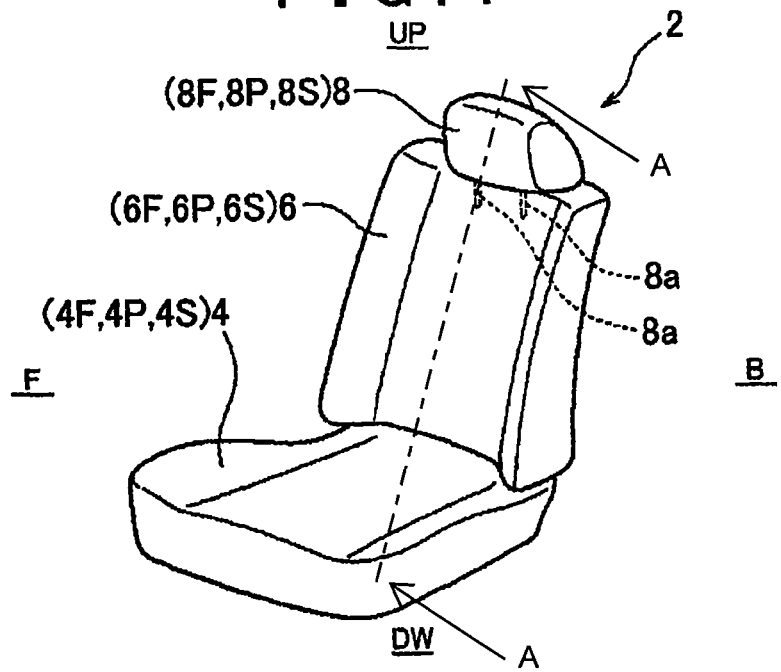
FIG. 1 is a perspective view of a vehicle seat according to an example embodiment of the invention.

Hereinafter, example embodiments of the invention will be described with reference to FIGS. 1 to 4. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat, as appropriate. Also, the outside in the seat width direction will be referred to simply as "outside" or "outer", and the inside in the seat width direction will be referred to simply as "inside" or "inner". The vehicle seat 2 in FIG. 1 includes a seat cushion 4, a seat back 6, and a headrest 8. Each of these seat structure members includes a frame member (4F, 6F, 8F) that forms a seat frame, a cushion (4P, 6P, 8P) that forms the outer shape of the seat, and a cover (4S, 6S, 8S) that covers the cushion. Here, the headrest 8 has a pair of stay members 8a and is attached to an upper portion of the seat back 6. Each of the pair of stay members 8a is a rod-shaped member. The pair of stay members 8a is arranged parallel to one another a predetermined distance apart, on a lower portion of the headrest 8.

The seat back 6 is a generally rectangular-shaped member that is connected to the seat cushion 4 in a manner that enables it to be reclined and raised with respect to the seat cushion 4, and includes the basic structures 6F, 6P, and 6S described above. The cover 6S may be made of fabric (woven, knit, or non-woven fabric) or leather, for example. In this example embodiment, the cushion 6P is covered by the cover 6S while being arranged on the frame member 6F (see FIGS. 1 to 4). An occupant PA is elastically supported by the cushion 6P. With this type of seat structure, it is desirable to improve the support performance of the cushion 6P while suitably maintaining seating comfort. Therefore, in this example embodiment, the support performance of the cushion 6P is improved while suitably maintaining seating comfort.

Figure 3:
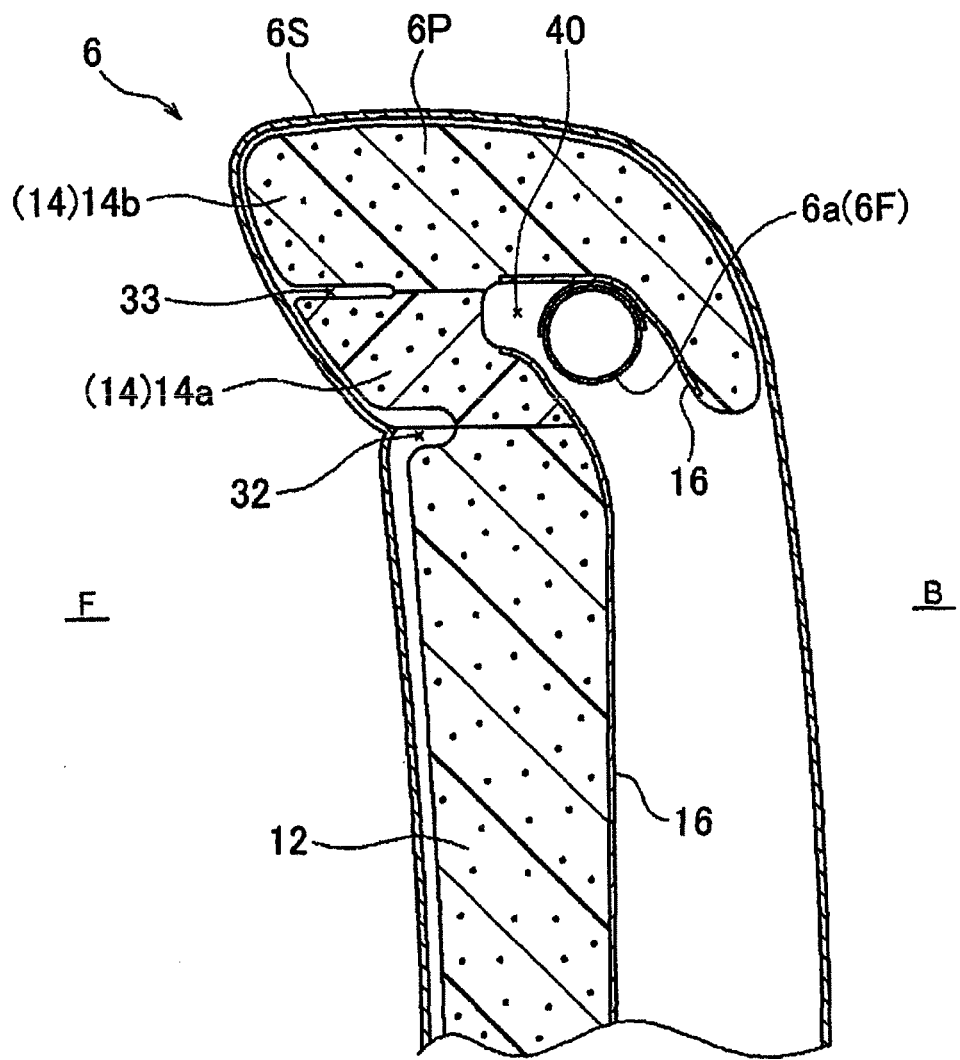
FIG. 3 is a partial lateral sectional view of a portion of the cushion of FIG. 2 along cross-sectional line B-B.
Figure 4A:
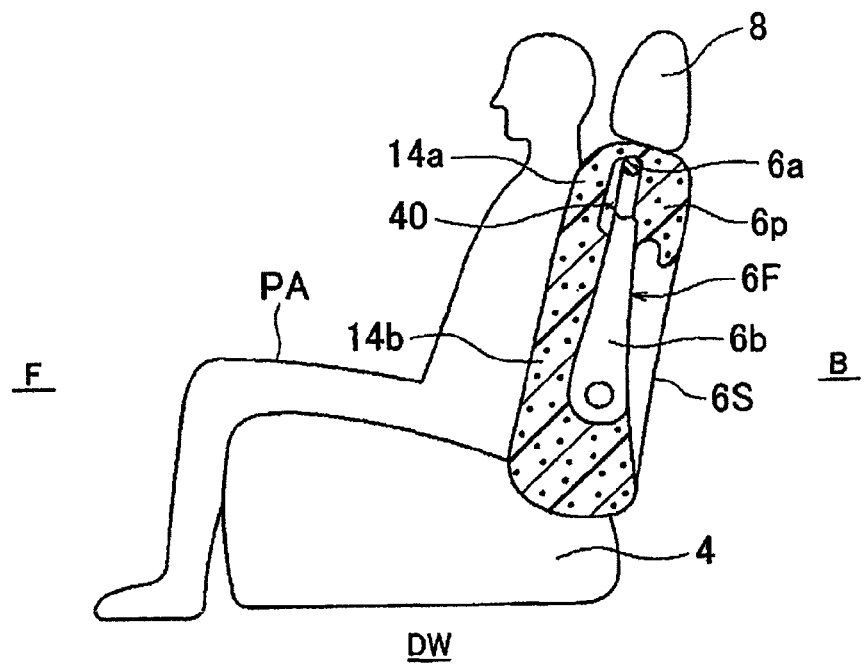
FIG. 4A is a longitudinal sectional view of the vehicle seat of FIG. 1 along cross-sectional line A-A, in a side view schematically showing the vehicle seat normally.
Figure 4B:
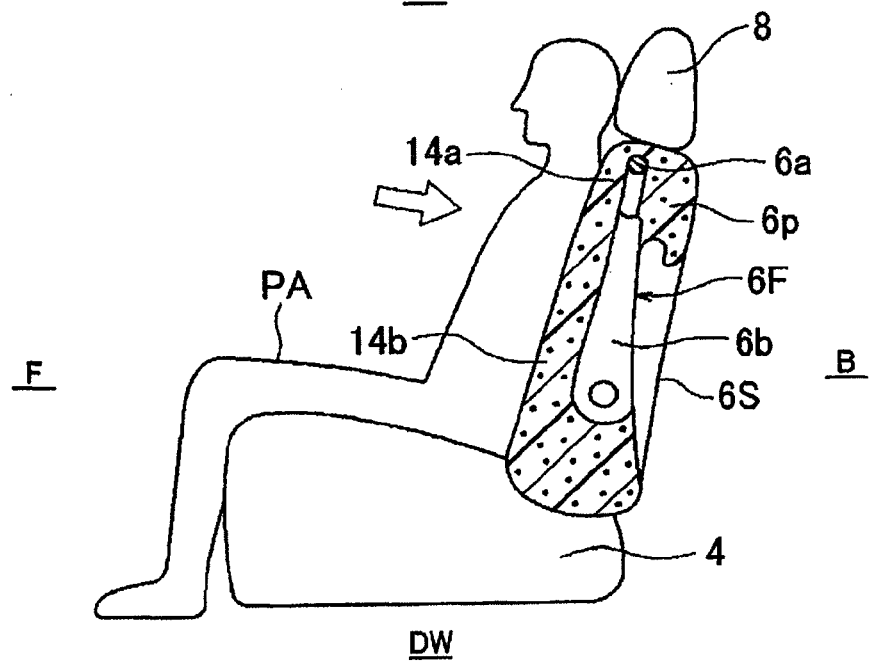
FIG. 4B is a longitudinal sectional view of the vehicle seat of FIG. 1 along cross-sectional line A-A, in a side view schematically showing the vehicle seat at the time of a rear-end collision.

The arch-shaped frame member 6F includes an upper frame 6a, and a pair of side frames 6b (see FIGS. 3 and 4). The upper frame 6a is a rod member that forms an upper portion of the seat and has a generally inverted U-shape when viewed from the front. Also, the upper frame 6a has a pair of brackets, not shown. The brackets are cylindrical members for inserting the stay members 8a into. In this example embodiment, the pair of brackets may be arranged a predetermined distance apart on the upper frame 6a. Also, each of the pair of side frames 6b is a flat plate member that forms a seat side portion, and is fixed to a lower end of the upper frame 6a.

Figure 2:
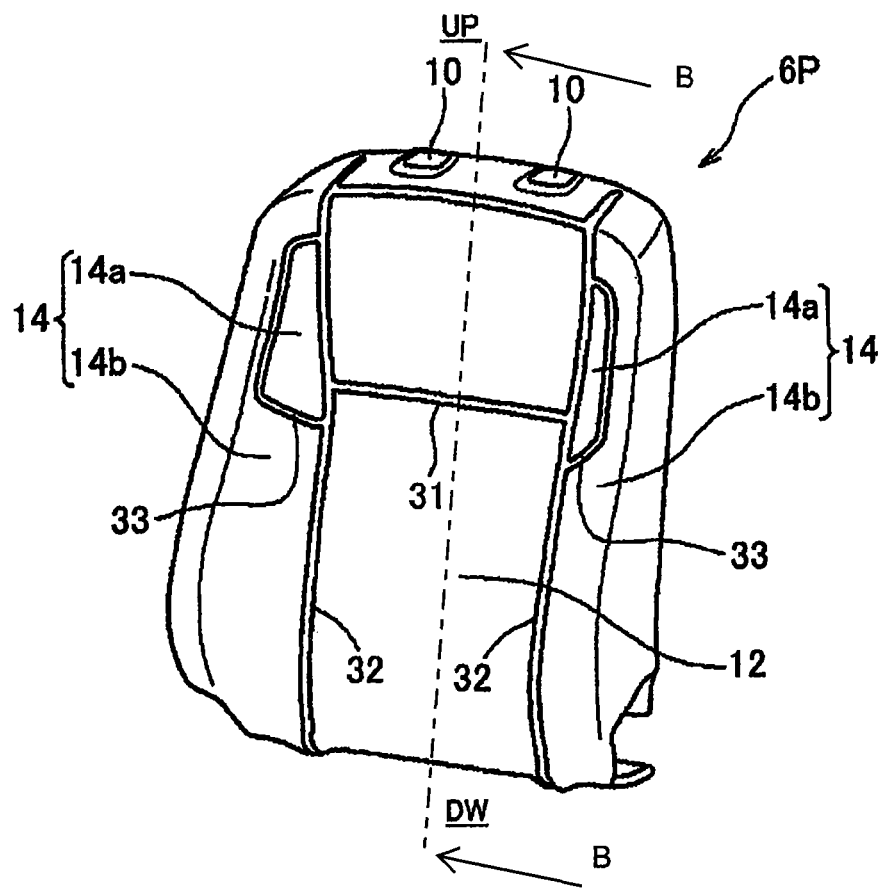
FIG. 2 is a perspective view of a cushion of the vehicle seat.

The cushion 6P has a generally rectangular shape, and elastically supports the occupant PA (see FIGS. 2 to 4). The cushion 6P in this example embodiment includes a pair of holes 10, a main portion 12, a pair of side portions 14, a backing 16, and a plurality of grooves 31 to 33. Each of the pair of holes 10 is a through-hole in the cushion 6P. The pair of holes 10 is formed a predetermined distance apart in an upper portion of the cushion 6P. In this example embodiment, the stay members 8a may be fixed to the upper frame 6a (i.e., the brackets) through the holes 10. Also, the backing 16 is a planar-shaped member that has less expandability (i.e., that does not expand as easily as) the cushion 6P, and is arranged on a back surface of the cushion 6P. The backing 16 may be made of fabric (woven, knit, or non-woven fabric), leather, or a resin layer, for example. The plurality of grooves (i.e., a first groove 31, a second groove 32, and a third groove 33) are all linear concave portions of the cushion 6P that retain a portion of the cover 6S by the portion of the cover 6S being tucked into these groove portions, for example.

The main portion 12 is a flat portion in the center of the cushion 6P, that opposes the torso (i.e., the back and chest and the like) of a seated occupant (see FIG. 2). The main portion 12 in this example embodiment has a wide generally rectangular shape when viewed from the front, and is divided laterally into upper and lower portions by the first groove 31 that extends in the seat width direction. The material of the main portion 12 is not particularly limited, but is flexible material that elastically compresses more than a second portion 14b that will be described later. One example of this type of material is low hardness (flexible) polyurethane foam.

The side portions 14 are arranged on the outsides of the main portion 12 and protrude toward the seating side of the seat back 6. Each of the side portions 14 includes a first portion 14a and a second portion 14b (see FIGS. 2 to 4). In this example embodiment, the pair of side portions 14 is formed on each side of the main portion 12. Each side portion 14 has a narrow generally rectangular shape when viewed from the front, and is separated from the main portion 12 by the second groove 32 that extends in the vertical direction of the seat. The first portion 14a and the second portion 14b are divided by a generally rectangular third groove 33.

The first portion 14a opposes a shoulder of the seated occupant, and is formed on an upper portion of the side portion 14. The first portion 14a in this example embodiment is provided to the inside of the third groove 33, and has a generally rectangular shape that is long in the vertical direction, and has a somewhat short width dimension. That is, the first portion 14a is formed from the side of the main portion 12 to substantially the center of the side portion 14. Here, the material of the first portion 14a is not particularly limited, but is flexible material that elastically compresses more than the second portion 14b that will be described later. One example of this type of material is low hardness (flexible) polyurethane foam. The main portion 12 and the first portion 14a may be made of the same material (i.e., materials of the same hardness), or they may be made of different materials (i.e., materials of different hardnesses).

In this example embodiment, the first portion 14a is provided continuous (from the seating side to the back surface side) in the thickness direction of the side portions 14. Also, a clearance (i.e., a gap 40) is formed between the upper frame 6a and the first portion 14a by appropriately adjusting the thickness dimension of the first portion 14a. Here, the back surface of the first portion 14a is preferably exposed and thus not provided with the backing 16. This enables the first portion 14a to elastically compress easier under pressure (that will be described later) from the occupant PA.

The second portion 14b is a portion that forms the side portion 14 other than the first portion 14a. The second portion 14b in this example embodiment includes a lower portion of the side portion 14 and an upper portion of the side portion 14 excluding the first portion 14a (i.e., the side and upper portion and the like of the first portion 14a). The second portion 14b is high hardness material that does not elastically compress as easily as the main portion 12 and the first portion 14a. An example of this kind of material may be high hardness polyurethane foam (such as polyurethane foam having approximately three times the hardness of low hardness polyurethane foam).

Referring to FIGS. 2 to 4, the cushion 6P is covered by the cover 6S while arranged on the frame member 6F. At this time, the clearance (i.e., the gap 40) is formed between the upper frame 6a and the first portion 14a (see FIG. 3). Therefore, during normal driving, the upper frame 6a and the first portion 14a are separated by this gap 40. Also, the frame member 6F is made to abut against the second portion 14b (i.e., the back surface side) of the lower portion of the side portion 14 by appropriately adjusting the thickness dimension of the second portion 14b. Next, the headrest 8 is arranged (on or) above the seat back 6 while attached to the frame member 6F. Accordingly, the headrest 8 is able to be attached to the seat back 6 without moving with the elastic compression (that will be described later) of the cushion 6P.

Also, during normal driving, the feeling of pressure on the occupant PA can be reduced by loosely supporting the torso and shoulders of the occupant with the main portion 12 and the first portion 14a that are portions that elastically compress well. That is, the structure provides good seating comfort. Also, the support performance of the seat is able to be maintained by firmly supporting the occupant PA with the second portion 14b that is a portion that does not elastically compress well. At this time, with this example embodiment, the second portion 14b is provided on the lower portion of the side portion 14 and the like. Therefore, even if pressure from the occupant PA is applied to the lower portion of the side portion 14 when the load of the occupant shifts when the vehicle is cornering or when the vehicle is involved in a collision, the support performance of the cushion 6P is still able to be well displayed.

With the seat structure described above, when the vehicle is involved in a collision (particularly a rear-end collision), the occupant PA will be pushed against the seat, and the head of the occupant will swing backward and forward (see FIG. 4). Therefore in this example embodiment, the upper frame 6a and the first portion 14a are arranged separated by the gap 40. The impact at the time of the collision will cause the occupant PA to be pushed against the seat back 6, such that the gap 40 between the first portion 14a and the upper frame 6a shrinks while the upper portion of the cushion 6P elastically compresses. As a result, the headrest 8 is able to be relatively displaced toward the seating side of the seat back 6. In this way, when the vehicle is involved in a collision, the head of the occupant is able to quickly abut against the headrest 8, i.e., forward-and-backward movement of the head is able to be suitably suppressed, by the elastic compression of the upper portion of the cushion 6P.

As described above, in this example embodiment, the first portion 14a and the main portion 12 elastically compress easier than the second portion 14b, so the seating comfort of the seat is able to be well maintained. Also, the second portion 14b does not elastically compress as easily as the first portion 14a and the main portion 12, so the support performance of the cushion 6P is able to be improved. In this example embodiment, when the vehicle is involved in a collision, the headrest 8 is relatively displaced toward the seating side (i.e., quickly abuts against the head of the occupant), so forward-and-backward movement of the head of the occupant is able to be suitably prevented or reduced (i.e., the structure provides excellent support performance). Therefore, with this example embodiment, the support performance of the cushion 6P is able to be improved while the seating comfort is able to be well maintained.

The vehicle seat in this example embodiment is not limited to the example embodiment described above. Various other example embodiments are also possible. In the example embodiment described above, the gap 40 is formed between the upper frame 6a and the first portion 14a, but this gap may also be omitted. Also in the example embodiment described above, the structure of the first portion 14a is described, but the shape, position, and number and the like of the first portion are not limited. Further, in the example embodiment described above, the main portion and the side portions (or the first portions and the second portions) may be simultaneously formed when the cushion is formed. Also, the main portion and the side portions may be formed separately and then connected together.

What is claimed is:

1. A vehicle seat comprising:
   a seat cushion; and
   a seat back that is connected to the seat cushion in a manner so as to be able to be raised and reclined with respect to the seat cushion,
   wherein the seat back has a cushion that supports an occupant; the cushion includes a main portion that opposes a torso of the occupant when the occupant is seated, and a side portion that is arranged on an outside of the main portion in a seat width direction and that protrudes toward a seating side of the seat back; the side portion includes a first portion that is arranged on an upper portion of the side portion and opposes a shoulder of the occupant when the seat back is in an upright position, and a second portion that forms the side portion other than the first portion; and the first portion and the main portion are configured to elastically compress easier than the second portion.

2. The vehicle seat according to claim 1, further comprising a headrest that is arranged on or above the seat back, wherein the seat back has a frame member that forms a seat frame; the headrest is attached to the frame member; and the cushion is arranged on the frame member while a gap is provided between the frame member and the first portion.

3. The vehicle seat according to claim 1, wherein the first portion has a generally rectangular shape that is long in a vertical direction, and a length of the first portion is shorter than a length of the second portion, when the seat back is in the upright position.

* * * * *